United States Patent [19]

Ketonen

[11] Patent Number: 4,881,582
[45] Date of Patent: Nov. 21, 1989

[54] JIB-MOUNTED SUSPENSION DEVICE FOR A TIMBER HARVESTER

[76] Inventor: Lauri K. Ketonen, Huvilakatu 15, SF-64100 Kristiinankaupunki, Finland

[21] Appl. No.: 267,123
[22] PCT Filed: May 13, 1987
[86] PCT No.: PCT/FI87/00064
§ 371 Date: Oct. 28, 1988
§ 102(e) Date: Oct. 28, 1988
[87] PCT Pub. No.: WO87/06794
PCT Pub. Date: Nov. 19, 1987

[30] Foreign Application Priority Data

May 13, 1986 [FI] Finland .................................. 861985
Feb. 10, 1987 [FI] Finland .................................. 870530

[51] Int. Cl.$^4$ .............................................. A01G 23/08
[52] U.S. Cl. ...................................... 144/3 D; 144/27; 144/34 R
[58] Field of Search .................... 144/2.2, 3 D, 34 R, 144/34 C, 336

[56] References Cited

U.S. PATENT DOCUMENTS

| | | | |
|---|---|---|---|
| 3,738,401 | 6/1973 | Wiklund et al. | 144/34 R |
| 3,817,303 | 6/1974 | Kantola et al. | 144/34 R |
| 4,083,463 | 4/1978 | Ericsson | 144/34 R |
| 4,412,777 | 11/1983 | Foreslund | 144/34 R |
| 4,537,236 | 8/1985 | Kulju | 144/34 R |

FOREIGN PATENT DOCUMENTS 273788  7/1988  European Pat. Off. .......... 144/34 R

Primary Examiner—W. Donald Bray
Attorney, Agent, or Firm—Jones, Askew & Lunsford

[57] ABSTRACT

Suspension device for suspending a felling processor (1) to be installed at the end of the jib (13) of a loader by means of an upper joint (12, 18, 17), which suspension device includes a turning motor (11) to turn the frame (6,9) of the suspension device and with it the harvester (1), an operating device e.g. a hydraulic cylinder (7) to turn the harvester to the desired vertical or horizontal position and in which the suspension of the harvester from the frame (6, 9) of the suspension device is realized by means of a transverse joint (4) and the aforementioned operating device is secured between the frame (6, 9) of the suspension device and the frame of the harvester (1). By means of the suspension device in accordance with the invention an attempt is made to achieve a short length of the device and nevertheless to achieve a sufficient vertical rise. The turning shaft (10) of the suspension device in accordance with the invention is adapted so that its extension essentially goes behind the center of gravity of the harvester (1) i.e. on the saw (15) side.

4 Claims, 3 Drawing Sheets

JIB-MOUNTED SUSPENSION DEVICE FOR A TIMBER HARVESTER

The object of the invention is a suspension device to be installed at the upper end of the jib of a timber harvester by means of the upper joint, to suspend a harvester, the suspension device consisting of a turning motor to turn the frame of the suspension device and with it the harvester, an operating device, e.g. a hydraulic cylinder, to turn the harvester to the desired vertical or horizontal position, and in which the suspension of the harvester from the frame of the suspension device is carried out by means of a transverse joint and the aforementioned operating device is connected between the frame of the suspension device and the frame of the harvester.

Timber harvesters, which carry out all stages of the work except felling, are called timber processors. Nowadays most of them can be equipped with a so-called felling head. The purpose of this felling head is to bring the processor to a vertical position. The vertical position is required in order to take hold of the tree. In practice it is sufficient if the processor is even roughly in a vertical position so that the tree can be taken hold of. Felling and sawing is carried out by the cutting saw of the processor.

When the harvester is hanging freely it naturally tends to take a horizontal position, i.e. the center of gravity in the middle of the machine tends downwards. By means of the cylinder in the suspension device the harvester is turned in the direction of the suspension device by pushing the frame of the suspension device towards the stripping blades and the harvester now moves into a nearly vertical position, for the center of gravity tries to move under the upper joint.

After the felling stage the stripping and cutting of the tree take place with the tree in a horizontal position. The harvester hangs freely from its felling head and in addition a so-called grab turner is located on the felling head. The harvester is directed round its vertical shaft by this turner. Really this felling head is a suspension device, by which the harvester is made to rise to a vertical position advantageously by means of a hydraulic cylinder.

The problem with these felling heads or suspension devices is their great weight, great length, and also price. These problems are due to the fact that ordinary grab turners are used in these suspension devices. Because the diameter of the grab turners is large the turner must be located at the extreme top of the suspension device and further the turner should be in the felling position above the harvester. This is so that the harvester is able to turn sufficiently vertically. But now the length of the suspension device becomes great because the turner must be entirely situated in front of the stripping blades of the harvester.

In the suspension device in accordance with the invention an attempt is made to achieve a short length for the suspension device and nevertheless achieve a sufficient vertical rise. In addition the invention attempts to achieve as light and easily used construction as possible. The characteristics of the invention appear in the accompanying patent claims.

Even in the stage where the harvester is taking hold of the tree the jib of the crane can push the harvester against the trunk without the harvester in the vertical position trying to much to move away from the lower part of the tree as happened with earlier suspension devices. In a suspension device in accordance with the invention the upper joint is located during the felling stage close to the upper stripping blade. Thus a turning moment creating a horizontal pushing movement away in the lower part of the harvester is nonexistent. Further, by placing the cylinder that tilts the suspension device in the center of the device it is possible to minimize the length of the stroke of the cylinder. By selecting suitable securing points for the cylinder when the suspension device at one stage tilts towards the cutting saw the piston rod of the cylinder begins once again to push out of the cylinder. This kind of situation appears for example when the tree being stripped is prevented from moving backwards when the feeding device begins to drive the entire harvester forwards i.e. in the direction of the stripping blades. Because when the harvester is hanging freely it tends towards a horizontal position it is sufficient when, starting from this horizontal position the cylinder is able to develop even a small amount of the moment required to make the harvester rise to the vertical.

In what follows the invention is illustrated by reference to the accompanying figures, which show one form of application of the invention.

Figure 1:
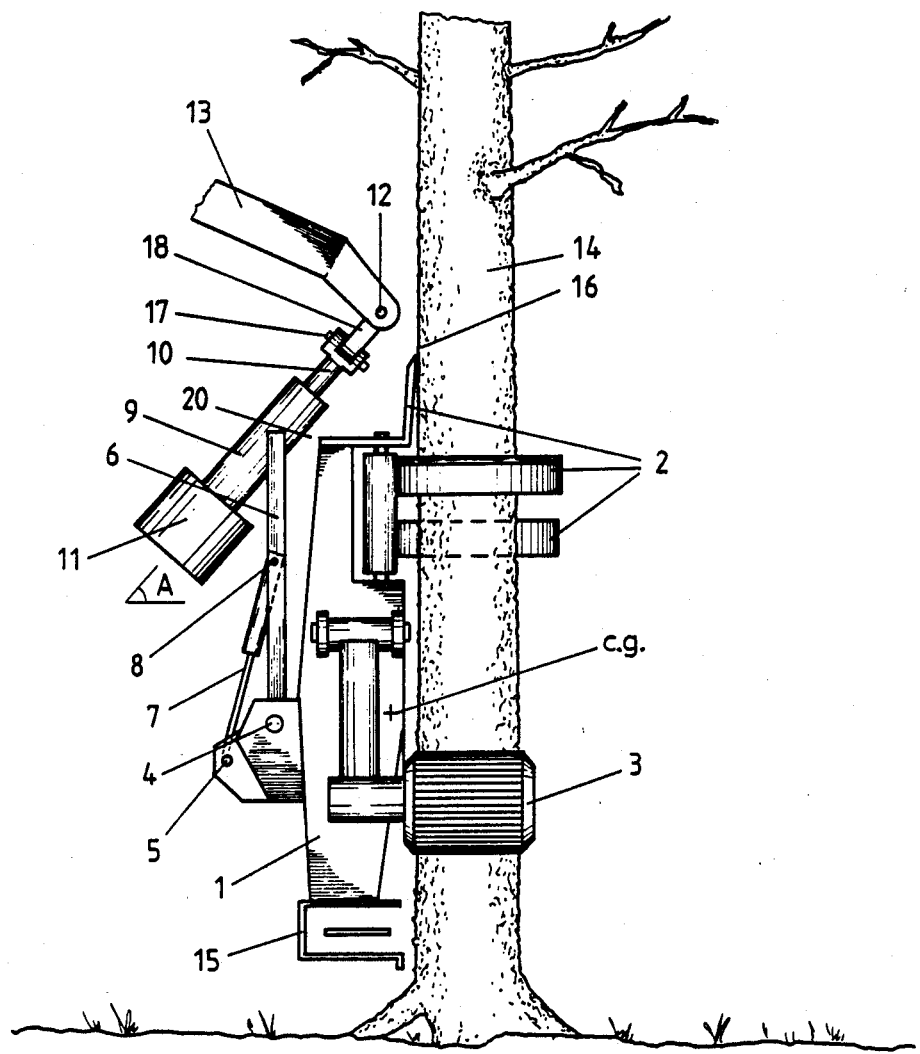
FIG. 1 shows the suspension device and harvester taking hold of a standing tree.

Securing lugs are attached to the frame 1 of the harvester by pins 4 and 5. Pin 4 secures the sub-frame 6 of the suspension device to frame 1 in such a way that the sub-frame 6 is able to turn about 140° around pin 4. The turning movement can be controlled by cylinder 7. Cylinder 7 is attached to frame 1 by pin 5 and to the sub-frame 6 by pin 8. The attachment of cylinder 7 thus permits sub-frame 6 to turn past the shortest position i.e. the lower dead center of cylinder 7.

Tube 9 is secured to the sub-frame 6. Inside tube 9 is axle 10, which is secured by bearing axially and radially to tube 9. Axle 10 is secured by pin 17 to cross-piece 18. Cross-piece 18 is further secured by pin 12 in the crane jib 13. The cross-piece 18, and pins 12 and 17 permit the frame 1 of the harvester to hang freely independently of the mutual position of frame 1 and sub-frame 6. Turning motor 11 is secured to tube 9. A second possibility would be to attach the motor to the sub-frame of the suspension device. Further cutting and felling saw 15, feeder rollers 3 and stripping blades 2 are secured to frame 1. In FIG. 1 the sawing to fell tree 14 to be felled has not yet been carried out. The center of gravity of the harvester is located at point 19, FIG. 1.

The operation of the suspension device: In FIG. 1 the piston rod of cylinder 7 is pushed out when sub-frame 6 is close to frame 1. At the same time tube 9 guides the front edge of frame 1 at point 20. It is also noticed that the straight line between pins 4 and 12 does not go through center of gravity 19, but that center of gravity 19 remains closer to the tree 14. But the straight line, which is in the line of axle 10 is located still further from center of gravity 19. It is also noticed that angle A, which is between axle 10 and the horizontal level, is significantly smaller that 90°. Up till now in previous suspension devices this corresponding angle is close to 90°. By locating the turning motor 11 in a slanting position on the suspension device is is possible to locate cylinder 7 partly parallel to turning motor 11, which saves in the overall length of the suspension device.

In FIG. 1 point 20, in which tube 9 and frame 1 meet, is marked. But now tube 9 can be made considerably thinner than turning motor 11. By placing axle 10 and at the same time thin tube 9 at an angle (angle A), securing point 12 can have a very advantageous position. As can be seen pin 12 is located only a little above point 16. The significance of point 16 is emphasized when jib 13 pushes the harvester in the felling position against the tree. Only an insignificant turning moment between pin 12 and point 16 moving the lower part of the harvester away from the tree arises.

Figure 2:
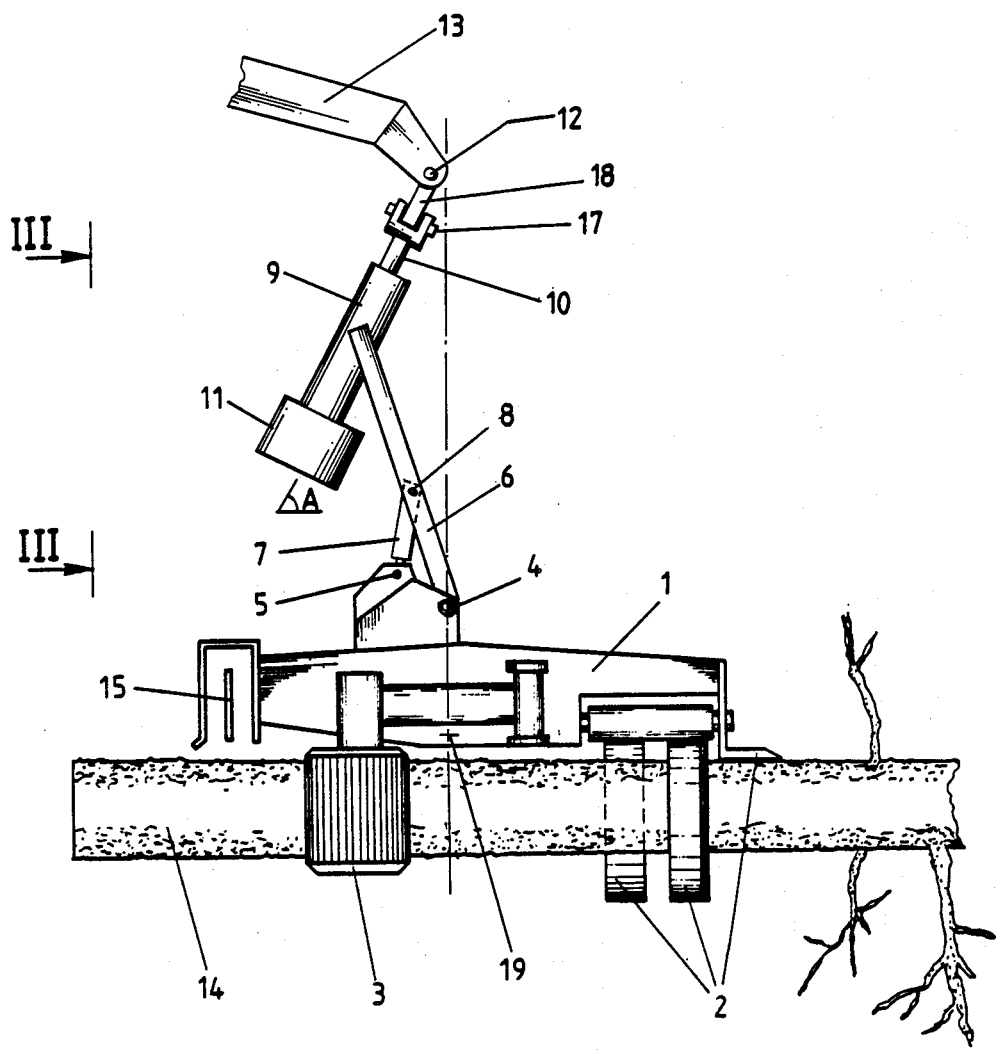
FIG. 2 shows the suspension device and harvester during the stripping and cutting stage of work.

In the stripping and cutting position in FIG. 2 the harvester hangs freely from pin 12, when pin 12 and pin 4 are more or less in the same vertical line. Without the tree the center of gravity 19 would be more or less in the line joining pins 12 and 4.

The size of angle A between axle 10 and the horizontal can be reduced to even 45°. It would then be advantageous that axle 10 would be suspended from jib 13 by a constant angular velocity joint. This is because when turning motor 11 turns the harvester the moment requirement varies unreasonably when using a normal universal i.e. cardan joint, especially if pins 17 and 12 cannot for structural reasons be brought close together in the direction of axle 10.

Figure 3:
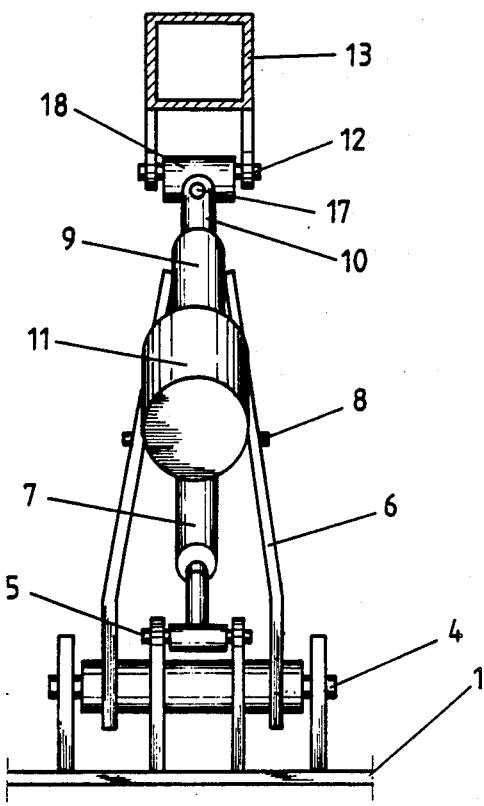
FIG. 3 shows a cross-section of the suspension device along the line II—II shown in FIG. 2.

In FIG. 3 the securing point of cylinder 7 in relation to frame 1 is seen. Because pin 5 is shorter than the inside dimension of frame 6, frame 6 is able to turn past pin 5. When pin 5 is passed pins 8, 5, and 4 in the same straight line. At this stage the piston rod of the cylinder begins to push out again is frame 6 still turns around pin 4 towards saw 15. Thus it is possible to have a very short length of stroke in cylinder 7. In the position in FIG. 2 the passing situation has not yet taken place.

I claim:

1. A suspension device for suspending a feller processor from the end of a loader jib, comprising:
    universal joint means supported from the end of the loader jib;
    an axle having a proximal end depending from the universal joint means so as to hang freely from the loader jib, and having a distal end;
    a sleeve disposed on the axle spaced apart from the proximal end;
    a bearing supporting the sleeve from the distal end of the axle;
    a turning motor secured to the sleeve and operative to rotate the axle relative to the sleeve;
    a suspension frame secured to the sleeve at an acute angle relative to the axle and having a lower end depending downwardly therefrom;
    means at the lower end of the suspension frame for pivotable attachment of a feller processor which has a center of gravity spaced beyond the pivotable attachment; and
    operating means associated with the suspension frame and the feller processor and operative to pivot the attached feller processor either to a substantially horizontal position where the center of gravity of the feller processor is below the pivotable attachment and is approximately in line with the pivotable attachment and the swivel joint means or to a substantially vertical position where the attached feller processor is positioned to receive a tree to be cut and said center of gravity is horizontally spaced from the pivotable attachment and from the suspension frame on the side thereof opposite the turning motor;
    thereby causing the weight of the attached feller processor acting through the suspension frame to position the freely-hanging axle and sleeve at an acute angle to horizontal in both the horizontal and vertical positions of the feller processor, so that rotation of the axle by the turning motor causes the suspension frame and the attached feller processor to turn on substantially a vertical axis about the universal joint means while imparting only axial loading on the bearing.

2. A suspension device in accordance with claim 1, wherein the bearing comprises an axial load-carrying bearing located below the securement of the suspension frame to the sleeve and carrying the weight of the entire suspension frame and the attached feller processor.

3. A suspension device in accordance with claim 2, wherein the aforementioned load carrying bearing is separate from the turning motor.

4. A suspension device in accordance with claim 6, wherein the universal joint means is of the constant angular velocity joint type.

* * * * *